United States Patent [19]

Bucefari et al.

[11] Patent Number: 5,054,725

[45] Date of Patent: Oct. 8, 1991

[54] APPARATUS FOR MANOEUVRING A TV CAMERA REMOTELY IN SPECIAL SHOOTING CONDITIONS

[76] Inventors: Massimo Bucefari, Via A. Mantegna, 1-Arezzo; Giovanni Giogli, Via Madonna del Vento, 25-Citta' Di Castello, both of Italy

[21] Appl. No.: 564,508

[22] Filed: Aug. 8, 1990

[30] Foreign Application Priority Data

Sep. 1, 1989 [IT] Italy .................................. 9516 A/89

[51] Int. Cl.⁵ .......................... G03B 17/00; F16M 3/00
[52] U.S. Cl. ............................... 248/123.1; 248/292.1; 352/243
[58] Field of Search ...................... 248/123.1, 648, 647, 248/663, 664, 162.1, 292.1, 297; 352/243; 354/81, 293

[56] References Cited

U.S. PATENT DOCUMENTS

| | | | |
|---|---|---|---|
| 2,211,088 | 8/1940 | Arnold | 352/243 X |
| 2,224,901 | 12/1940 | Cunningham | 248/123.1 |
| 2,447,667 | 8/1948 | Raby | 352/243 X |
| 3,891,301 | 6/1975 | Heller | 354/81 X |
| 4,515,333 | 5/1985 | Pugh et al. | 248/123.1 X |
| 4,523,732 | 6/1985 | Biber et al. | 248/123.1 |
| 4,849,778 | 7/1989 | Samuelson | 248/123.1 |
| 4,907,768 | 3/1990 | Masseron et al. | 248/123.1 |
| 4,943,019 | 7/1990 | Mester | 248/123.1 |

Primary Examiner—Karen J. Chotkowski

[57] ABSTRACT

An apparatus or maneuvering a TV camera remotely, for shooting in special conditions, so as to allow a cameraman to shoot without the need to move with the TV camera (15) and carry out a shot in special locations such as operating rooms or potentially hazardous industrial environments. The apparatus is formed by and articulated structure comprising a slide (3) vertically traversing on a column (2) with an end of a lifting arm (10), that is rotatable in a vertical plane about said end supporting at the other end a camera supporting arm (13), the latter being rotatable through 360° about said end in a horizontal plane and comprising a mechanism (14) for imparting two rotatory movements about two perpendicular axes to the TV camera (15) mounted thereon. All the movements of the structure are independently driven; means for the remote control of said movements are provided.

9 Claims, 3 Drawing Sheets

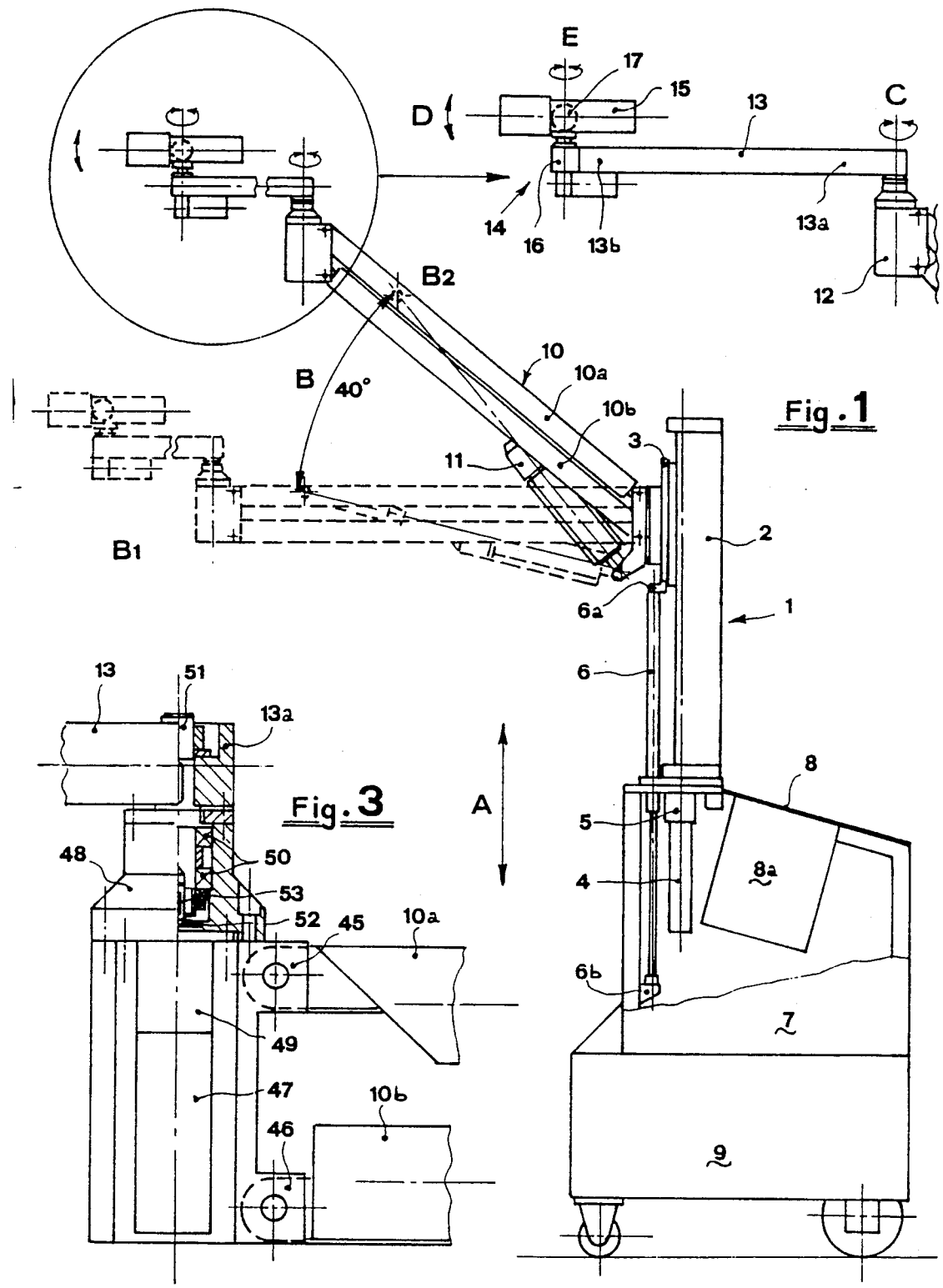

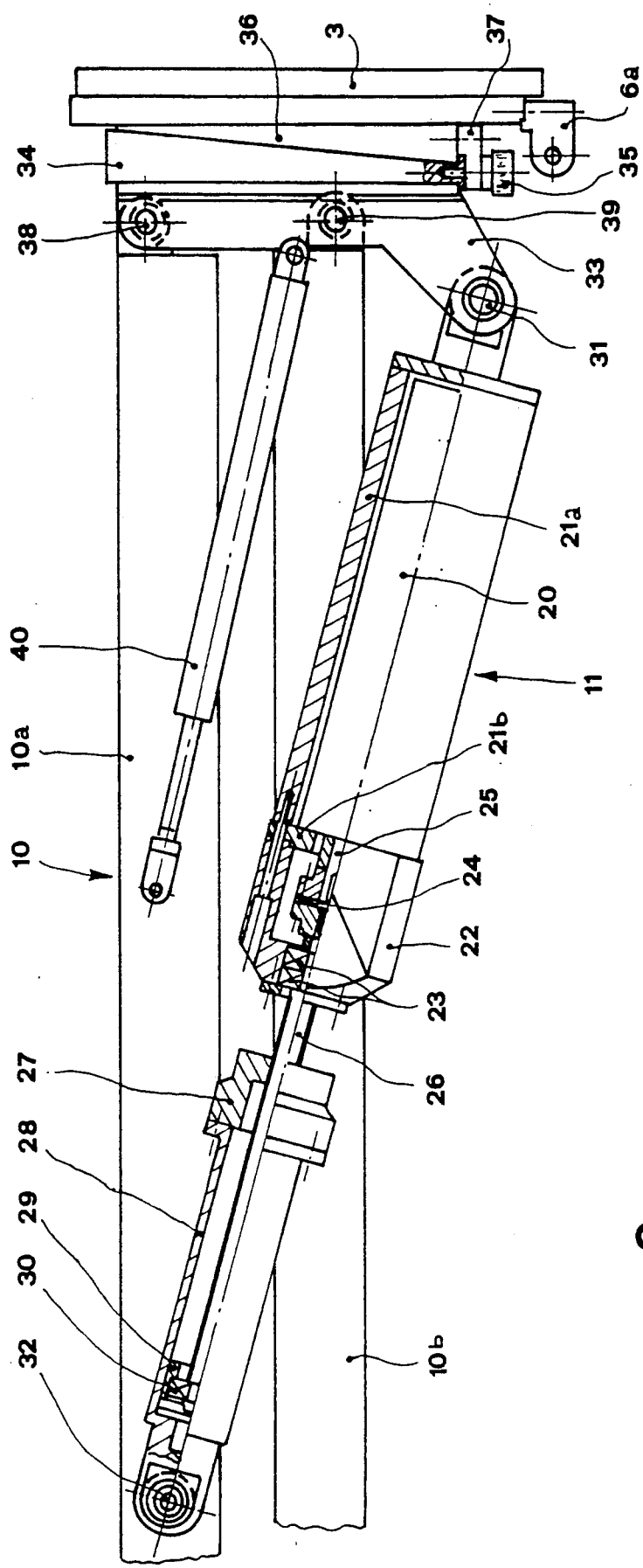

APPARATUS FOR MANOEUVRING A TV CAMERA REMOTELY IN SPECIAL SHOOTING CONDITIONS

DESCRIPTION

1. Field of the Invention

The present invention relates to an apparatus for maneuvering a television camera remotely in special shooting conditions, particularly in surroundings where the presence of a cameraman may constitute an obstruction, such as in an operating room when filming surgery, or in hostile environments where the health of the cameraman may be placed at risk from pollution or contamination.

2. Background Art

Whilst there is by now a pressing requirement for television facilities in operating rooms, given the need to film surgery for scientific, didactic and legal purposes, the presence of a technician moving around internally of the room with a TV camera in order to shoot from different angles is undoubtedly a hindrance to the surgeons and nurses, and may also affect the outcome of the operation, with negative consequences for the patient.

Similarly, television cameras are used frequently in the fields of industry and scientific research, for example in monitoring chemical reactions from close range or to make filmed records of industrial processes. In these instances, it is the technician who may be at personal risk where such reactions or processes constitute an injury or health hazard.

The operating difficulties encountered in these and other similar situations ar often tackled by using fixed cameras providing panoramic vision. However, such a system excludes any possibility of effecting close-up and angled shots, unless several cameras are installed at different fixed stations. What is more, there may be a requirement for shooting at more than one location, say in a number of adjacent operating rooms, in which case the fixed camera stations must be dismantled and re-erected at each of the scheduled locations.

For some time now, the art field has also embraced mobile structures (more especially as encountered in large television and film studios) by which the camera is carried on a universally rotatable mount; the design of these structures is such that the operator can grip and maneuver the camera without having to support its weight. Whilst such a system provides stability and optimum visual results, the problems connected with operator safety remain and the hindrance factor is indeed increased.

Accordingly, the object of the present invention is to provide an apparatus for remote maneuvering of a TV camera in special shooting conditions in order to enable an operator to position the camera through several axes from a distance and obtain optimum results in shooting, while occasioning no hindrance and avoiding any personal injury or health risk.

SUMMARY OF THE INVENTION

The stated object is fully realized in the apparatus according to the invention characterized in that the camera is mounted to one end of an articulated structure comprising: a column, a lifting arm slidably anchored at one end to said column and angularly movable in a vertical plane by pivoting about its sliding end, and a camera supporting arm connected to the other end of said lifting arm by means of a first support rotatable through 360° in a horizontal plane. To the free end of the camera supporting arm there is mounted a mechanism comprising a second and a third support pivotable about vertical and horizontal axes, respectively. The articulated structure also comprises means for sliding vertically and angularly displacing said lifting arm, means for maintaining in a vertical attitude the axis of said first support whatever the rotational position of said lifting arm is, and drive means for independently rotating said first, second and third support.

DESCRIPTION OF THE DRAWINGS

Further characteristics and advantages of the apparatus for remotely maneuvering a television camera according to the present invention will become apparent from the following description of a not limiting and exemplyfying embodiment thereof with reference to the accompanying drawings, in which:

FIG. 1 is an overall view of the apparatus according to the present invention;

FIG. 2 is a partly sectional view of the unit by which the lifting arm is maneuvered in the apparatus according to the invention;

FIG. 3 is a partly sectional view of the support connecting the lifting arm and the camera supporting arm of the apparatus according to the invention;

DESCRIPTION OF A PREFERRED EMBODIMENT

Figure 4:
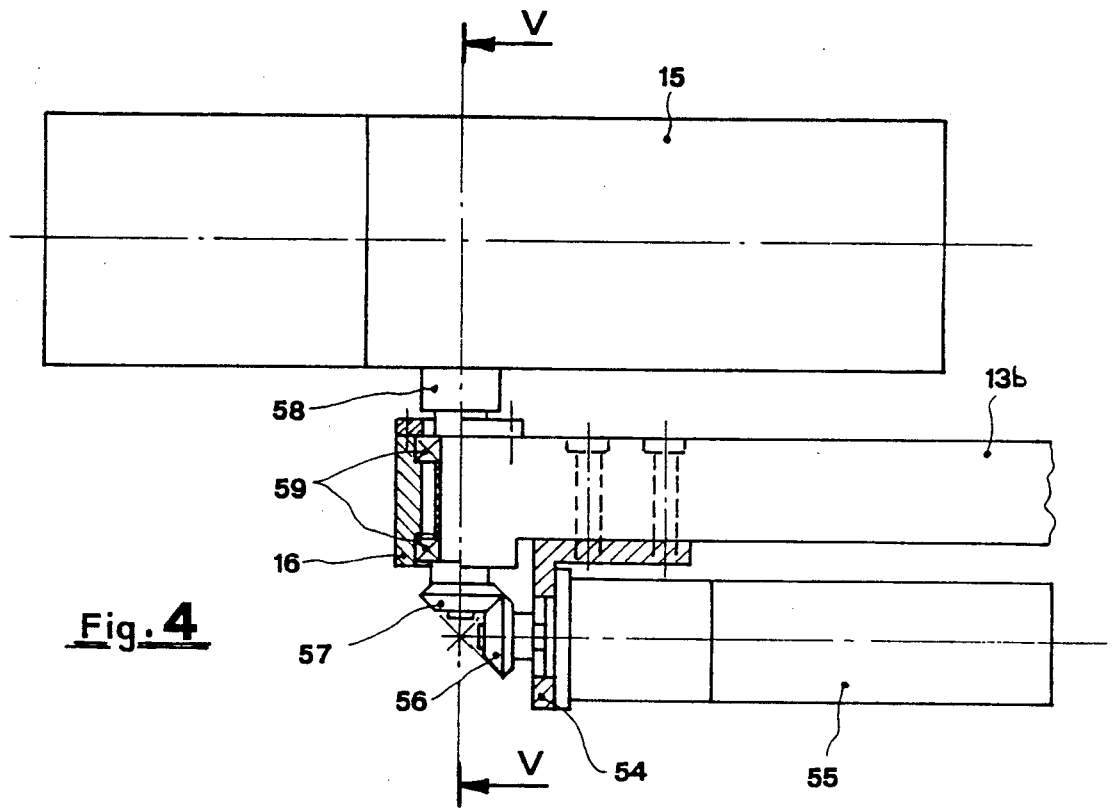
FIG. 4 is an enlarged side view, partly in section, of the mechanism for maneuvering a TV camera mounted to the end of the camera supporting arm.

With reference to FIG. 1, 1 denotes generally the apparatus according to the invention, viewed in a possible embodiment that comprises a column 2, and a slide 3 capable of vertical movement on the column and driven by a geared motor 4 through a recirculating ball thread and lead screw transmission 5. To ensure stability of the vertical traverse and prevent the slide 3 and all associated components from descending when the motor 4 is disconnected from its power source, the slide 3 is hinged by way of a lug 6a to one end of a damper 6 of which the other end is anchored to a lug 6b afforded by the main frame 7 of the apparatus 1. The frame 7 also houses a control console 8, a monitor 8a, and propulsion means 9.

A lifting arm 10, in the form of an articulated parallelogram linkage, has two rods 10a and 10b that are hinged by one of their respective ends to the slide 3, as well as a drive unit 11 for said lifting arm 10.

A camera supporting arm 13 is rotatably connected at one end 13a to a support 12 mounted to the remaining ends of lifting arm 10; at the opposite end 13b a mechanism 14 is provided for maneuvering a TV camera 15. The mechanism 14 comprises a support 16 disposed about a vertical axis and rotatably connected to a further support 17, disposed about a horizontal axis, to which the camera 15 is rotatably mounted.

More in detail, and referring to FIG. 2, the drive unit 11 by which the parallelogramm lifting arm 10 is maneuvered comprises: a geared motor 20, accommodated internally of a housing 21a and mounted by way of a flange 21b to a support 22 containing bearings 23 and a coupling 24 by which the shaft 25 of the motor 20 is connected to a lead screw 26; the screw passes through a lead nut 27 rigidly associated with a cylinder 28 that slidably accommodates a bushing 29 serving as a terminal for the screw 26 and associated therewith by way of a bearing 30. The housing 21a and the cylinder 28 afford respective hinges 31 and 32 by way of which the corresponding ends are connected pivotably to a bracket 33 and to rod 10a. The bracket 33 comprises a wedge 34 by way of which the entire assembly of the elevating arm 10 and its drive unit 11 is connected to the slide 3; the connection is made secure by screws 35 that clamp the wedge 34 into a corresponding wedged seating 36 formed in the slide 3, the clamping force being applied against projections 37. Also pivotably connected to the bracket 33 by way of relative hinges 38 and 39 are the bottom ends of the rods 10a and 10b of lifting arm 10, together with one end of a damper strut 40 of which the remaining end is anchored to the upper rod 10a; the strut 40 serves to stabilize the movement of lifting arm 10 when rotated about its hinges 38 and 39, and to prevent any such rotation when the drive unit 11 is disconnected from its power source.

As discernible from FIG. 3, the opposite ends of the rods 10a and 10b are pivotably connected by way of hinges 45 and 46 to a housing 47 carrying a support 48 and a geared motor 49. The support 48 carries bearings 50 rotatably accommodating a drive shaft 51 to which rotation is transmitted from the shaft 52 of the motor 49 by way of a keyed coupling 53; the end of the drive shaft 51 opposite from the motor 49 is connected to one end 13a of the camera arm 13.

Figure 5:
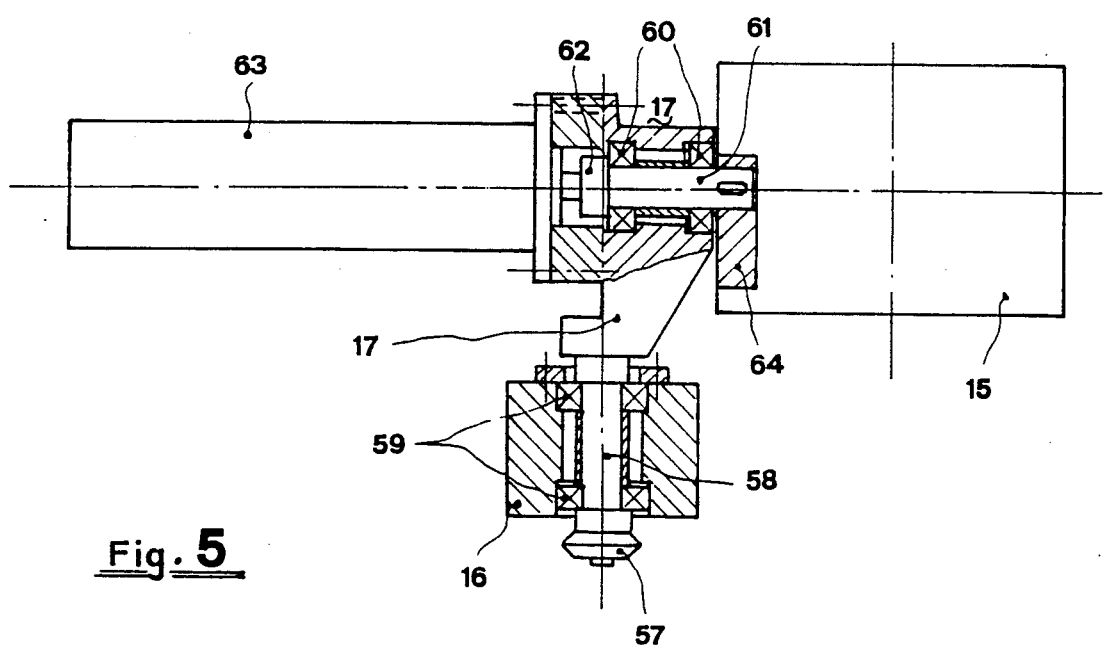
FIG. 5 is a front sectional view through V-V of the mechanism shown in FIG. 4.

As illustrated in FIGS. 4 and 5, the end 13b of the camera arm 13 farthest from the lifting arm 10 carries an angled flange 54 supporting a geared motor 55. Power from the motor 55 is transmitted by way of a bevel gear pair 56 and 57 to a shaft 58 of which the axis is disposed at right angle to that of the motor 55. The shaft 58 is rotatably housed through bearings 59 in the support 16 formed at the free end of the camera supporting arm 13 and is integral with the support 17 having a seat in which a shaft 61 is pivotably housed through bearings 60.

Shaft 61 is connected at one end by way of a relative coupling 62 to a further geared motor 63. The end of the shaft 61 opposite from the motor is keyed into a socket 64 afforded by the camera 15.

Operation of the apparatus according to the invention will now be described, with reference to the drawings.

By actuating the geared motor 4, the lead screw 5 causes the slide 3 to vertically traverse on the column 2 and the entire assembly comprising the lifting arm 10 and camera supporting arm 13 can be moved vertically in the direction of the arrow A.

In addition to and independently of the above described traversing movement, the lifting arm 10 is able to rotate in a vertical plane as shown by the arrow B between a first position B1 (phantom line in FIG. 1) and a second position B2, describing an angular movement which, in the present embodiment, is limited to 40°. This movement is produced by the drive unit 11. Thanks to the articulated parallelogram structure of the lifting arm 10, the axis of the first support 12 will remain disposed faultlessly vertical regardless of the position of the arm 10, by virtue of which, in turn, the camera arm 13 maintains a perfectly horizontal axis within its own field of rotation of 360° about the axis of the support 12, driven by the relative geared motor 49, as indicated by the arrow C.

The television camera 15 carried by the end 13b of the relative arm 13 is able to rotate independently about two axes of rotation, E and D, which coincide with the mutually perpendicular axes of the second and third supports 16 and 17, the corresponding movements being produced by the motors 55 and 63. Thus, with these two movements combined with those previously described, the camera is afforded freedom of movement through several direction. Working from the console 8, the camera 15 can be maneuvered without the physical presence of the operator creating any hindrance, particularly in a special environment such as an operating room. Advantageously, the console 8 can be separated from the remainder of the apparatus 1 so as to ensure the personal safety of the cameraman when filming in contaminated or otherwise hazardous environments.

In other alternative embodiments of the apparatus, the propulsion means 9 accommodated by the frame 7 might be omitted, as also might the frame 7 itself; in the latter instance, the column 2 can be wall-mounted or secured to a scaffold, or indeed fitted to any suitable fixed or mobile support structure.

The lifting arm 10 and camera supporting arm 13 are designed in such a way as to fold down one over the other, and with their removal made simple by adoption of the wedge clamping arrangement 34–36, the resulting collapsible assembly is rendered notably compact for transportation purposes.

Variations and/or modifications may be brought to the apparatus for remotely maneuvering a TV camera according to the present invention without departing from the scope of the invention itself.

We claim:

1. Apparatus for remote maneuvering of a television camera in special shooting situations, wherein the camera (15) is mounted on an articulated structure comprising:

a column (2);
   a lifting arm (10) having a first end adjustably connected to slide vertically on said column;
   said lifting arm (10) rotatably connected to said column in a vertical plane containing said column (2);
   drive means for vertically sliding said first end of said lifting arm (10);
   drive means (11) for rotating said lifting arm (10) in said vertical plane;
   a camera supporting arm (13) connected at a first end to a second end of said lifting arm (10) through a first horizontally rotatable support (12);
   means (10a, 10b) for maintaining a vertical axis of rotation for said first support;
   a mechanism (14) mounted at a second end (13b) of said camera supporting arm (13);
   said mechanism comprising a second horizontally rotatable support (16) and a third vertically rotatable support (17) to which the camera is mounted;
   drive means (49, 53, 63) associated with each of said supports for rotating said supports; and
   control console means (8) for independently and remotely operating and monitoring each said drive means.

2. Apparatus according to claim 1, wherein said means for vertically sliding said first end of said lifting arm (10) on said column (2) comprises a vertical lead screw coupled via a recirculating ball thread (5) with a vertical slide (3) to which said first end of said lifting arm (10) is connected.

3. Apparatus according to claim 1, wherein said means for maintaining said vertical axis of rotation for said first support (12) comprises a rod (10b) parallel with and equal in length to said lifting arm (10) and pivotably connected to said first support (12) and to said slide (3), said lifting arm (10) being pivotably connected to said first support (12).

4. Apparatus according to claim 1, wherein said means for rotating said lifting arm (10) comprises a lead screw drive (11) pivotably connected to the slide (3) and to the arm (10).

5. Apparatus according to the claim 1, wherein said camera (15) is mounted to said third vertically rotatable support (17), said third support (17) being mounted pivotably to said second support (16), said second support being pivotably connected to the end of said camera supporting arm (13).

6. Apparatus according to claim 1, further comprising a control console (8) and a monitor (8a).

7. Apparatus according to claim 1, wherein said column (2) is fixable to a base frame (7) comprising means (9) for the propulsion of the entire apparatus.

8. Apparatus according to claim 1, wherein said camera supporting arm (13) and said lifting arm (10) are foldable together when dismounted thus forming a compact assembly for transportation purposes.

9. Apparatus according to the claim 2, wherein the lifting arm (10) is connected to the slide (3) by means of a wedge coupling (34, 36).

* * * * *